United States Patent [19]

Hester et al.

[11] Patent Number: 4,487,476

[45] Date of Patent: Dec. 11, 1984

[54] METHOD OF MULTIVARIANT INTRACLASS PATTERN RECOGNITION

[75] Inventors: Charles F. Hester, Huntsville, Ala.; David P. Casasent, Pittsburgh, Pa.

[73] Assignee: The United States of America as represented by the Secretary of the Air Force, Washington, D.C.

[21] Appl. No.: 258,500

[22] Filed: Apr. 28, 1981

[51] Int. Cl.³ .............................................. G06G 9/00
[52] U.S. Cl. ................................ 350/162.13; 364/822
[58] Field of Search ................... 350/162.13; 364/822; 356/71

[56] References Cited

U.S. PATENT DOCUMENTS

| | | | |
|---|---|---|---|
| 3,435,244 | 5/1966 | Burckhardt et al. | 250/219 |
| 3,779,492 | 12/1973 | Grumet | 350/162.13 |
| 3,814,520 | 6/1974 | Baker et al. | 356/71 |
| 3,814,943 | 6/1974 | Baker et al. | 250/550 |
| 3,879,131 | 4/1975 | Cuthbert et al. | 356/106 R |
| 3,905,019 | 9/1975 | Aoki et al. | 340/146.3 P |
| 3,993,976 | 11/1976 | Ginsburg | 340/146.3 P |
| 4,073,010 | 2/1978 | Casasent et al. | 364/822 |
| 4,084,255 | 4/1978 | Casasent et al. | 350/162.13 |
| 4,174,179 | 11/1979 | Tschudi et al. | 356/71 |
| 4,174,885 | 11/1979 | Joseph et al. | 350/162 SF |
| 4,338,030 | 7/1982 | Loos | 356/336 |

OTHER PUBLICATIONS

Mendelsohn et al., "Digital Methods in the Design of Optical Matched Filters for Target Recognition," 1980, pp. 148–153.

*Primary Examiner*—Bruce Y. Arnold
*Attorney, Agent, or Firm*—Donald J. Singer; Jacob N. Erlich

[57] ABSTRACT

A method of recognizing different perspective views or images (i.e., multivariant views) of the same object (i.e., intraclass patterns). Each intraclass pattern, or different representation of the same object, is described as an orthonormal basis function expansion, and a single averaged matched spatial filter is produced from a weighted linear combination of these functions. The method eliminates the multiple matched spatial filters, and the extensive postprocessing of the matrix output from a multichannel correlator, which are used in the prior art.

3 Claims, 3 Drawing Figures

PARTIALLY PRIOR ART

CROSS SECTIONAL SCANS THROUGH ONE
OUTPUT CORRELATION PEAK

METHOD OF MULTIVARIANT INTRACLASS PATTERN RECOGNITION

STATEMENT OF GOVERNMENT INTEREST

The invention described herein may be manufactured and used by or for the Government for governmental purposes without the payment of any royalty thereon.

BACKGROUND OF THE INVENTION

This invention relates to a method of recognizing a pattern and more particularly, of recognizing different perspective views or images (i.e., differences in tilt and/or rotation and/or magnification, hereinafter referred to as "multivariant views") of the same object (hereinafter referred to as "intraclass patterns").

On most pattern recognition problems, multivariant views or images of the intraclass pattern type must be recognized, and discrimination between multiobjects (i.e., different, but similar, objects) must also be maintained. Such pattern recognition problems arise in missile guidance, product line inspection, and elsewhere.

Prior approaches to the multivariant intraclass pattern recognition problem, and to the multiobject pattern recognition problem, have utilized multiple matched spatial filters (hereinafter a single said filter will be referred to as a "MSF"), extensive postprocessing of the matrix output from a multichannel correlator, and other non-MSF techniques.

What is needed in the art is a method of recognizing multivariant views of intraclass patterns, while maintaining discrimination between multiobjects, without requiring multiple MSFs or extensive postprocessing.

SUMMARY OF THE INVENTION

The instant invention fulfills the aforementioned need; and, thereby, constitutes a significant advance in the state-of-the-art.

In essence, we avoid the prior art necessity of using multiple MSFs and of extensive postprocessing by incorporating postprocessing into the MSF itself and by basing the average MSF on the correlation matrix.

Accordingly, the principal object of this invention is to provide a method of recognizing multivariant views of intraclass patterns, without loss of discrimination between multiobjects.

Another object of this invention is to attain the hereinbefore described pattern recognition by retaining the simplicity and real-time and parallel processing features of the well-understood optical plane correlator system, which said system will be reviewed, shown, and described later herein.

Still another object of this invention is to attain the hereinbefore described pattern recognition by utilizing the control, dynamic range, and flexibility of digital processors, together with the aforesaid optical plane correlator system.

A further object of this invention is to allow use of preprocessing, such as edge enhancement, by weighted MSF synthesis.

These objects of this invention, as well as other objects related thereto, will become readily apparent after a consideration of the description of the invention, together with reference to the contents of the Figures of the drawing.

DETAILED DESCRIPTION OF THE INVENTIVE METHOD

As to the use of the optical frequency plane correlator

Figure 1:
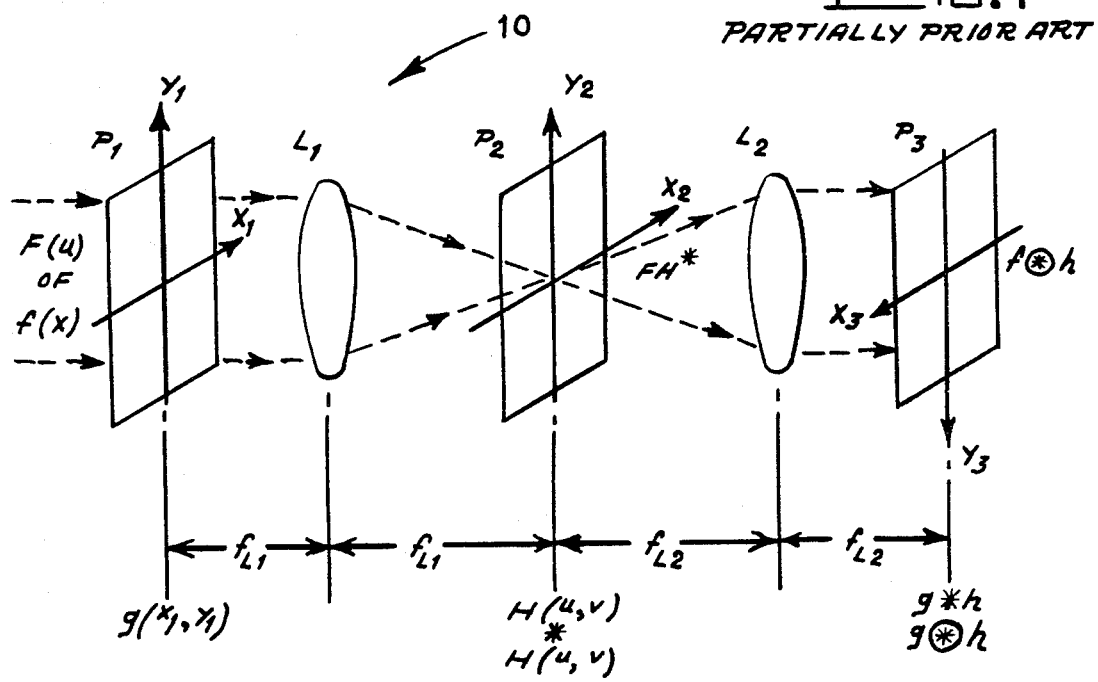
FIG. 1 is a perspective view, in simplified schematic and pictorial form, of the aforementioned optical frequency plane correlator, and our novel use of it.

With reference to FIG. 1, therein is shown a well known (optical) frequency plane correlator system 10. It is here to be noted that, although the correlator 10 is prior art, our manner of use of it is new. In this system, the input object f(x) is placed at $P_1$ and a MSF $H^*(u)$ at $P_2$. (Capital letters denote the Fourier transform of the corresponding space functions.) One-dimensional functions are used only to simplify notation. The Fourier transform, F(u) of f(x), is incident on $P_1$, and the light distribution leaving $P_2$ is $FH^*$. At $P_3$, the Fourier transform of this product of two Fourier transforms is produced, and hence the desired correlation $f \circledast h$ results.

Holographic techniques are used to produce the MSF by recording the interference of the Fourier transform of the function h and an off-axis plane wave reference beam at $P_2$. By adjusting the spatial frequency u at which the beam balance ratio K (equal to the ratio of the intensities of the reference and signal beams) is unity, a weighted MSF results in which different object spatial frequencies can be emphasized. This technique has been shown to be of use in reducing the correlation degradations due to expected within-class object differences.

In our multivariant intraclass pattern recognition method to be described, an intraclass reference h is formed off line by digital computer means. The MSF $H^*$ is then recorded on film and is placed at $P_2$.

As to hyperspace and basis functions

Our multivariant intraclass pattern recognition method utilizes a hyperspace (i.e., a multidimensional vector space) description of the intraclass and multiobject functions. Accordingly, the following is a brief review of this area and the use of orthonormal basis function expansion for the intraclass pattern recognition problem.

We denote the input image by f, the intraclass object functions to be recognized by g, and the average filter by h. We assume that K different inputs $\{f_k\}$ and N different orientations $\{g_n\}$ of the object function g can occur. The pattern recognition task is to recognize f if it belongs to the set $\{g_n\}$ and to reject it otherwise. For simplicity, we assume that the $\{g_n\}$ are different orientations of g and that the $\{f_k\}$ belong to the set $\{g_n\}$. Neither of these assumptions is essential to the general theory.

We begin by expanding f and g in a set of orthonormal basis functions $\{\phi_j\}$:

$$f(x) = \sum_j a_j \phi_j(x), \tag{1}$$

-continued $$g(x) = \sum_j b_j \phi_j(x), \quad (2)$$

where $$\int \phi_j(x)\phi_i(x)dx = \delta_{ji} \quad (3)$$

The set of basis functions $\{\phi_j\}$ establishes the set of expansion coefficients $a_j$ and $b_j$ that specifies f and g. We can thus represent f or g as a vector $$\hat{f} = (a_1, a_2, \ldots, a_k), \quad (4)$$

in a multidimensional vector space (hyperspace) whose axes are the basis function $\phi_j$. In terms of these expansions, the correlation of f and g can be described by $$R_{fg}(\tau) = f(x) \odot g(x) = \int f(x + \tau)g(x)dx \quad (5)$$

$$= \sum_i \sum_j a_j b_i \int \phi_j(x + \tau))\phi_i(x)dx$$

$$R_{fg}(0) = \sum_j a_j b_j = \hat{f} \cdot \hat{g}$$

The value of the correlation at the registration point $\tau = 0$ reduces to the simple summation of the products of the coefficients as in Eqs. (5). In this formulation, we see that the correlation of f and g has the special significance of the dot product.

When the various vectors corresponding to the $\{f_k\}$ or $\{g_n\}$ set of input objects are plotted as pointed in this hyperspace, discriminant surfaces can be drawn that enable intraclass objects to be grouped together and separated from multiobject false input. The shape of these discriminant hypersurfaces defines the average MSF to be used. The simple discriminant surfaces such as lines (hyperplanes) or circles (hyperspheres) are preferable. They correspond to $\hat{f} \cdot \hat{h}$ =constant or $\hat{f} \cdot \hat{f}$ =constant, respectively. In the first case, a single averaged filter $\hat{h}$ suffices. In the second case, requiring the autocorrelation of the input to lie within the specific range is an adequate discriminant. In the more general case, several averaged filters may be necessary to realize more complex discriminant hypersurfaces.

For a simple intraclass case in which either of the two vectors $\hat{f}_1 = (a_{11}, a_{12})$ and $\hat{f}_2 = (a_{21}, a_{22})$ are to be recognized and all other inputs rejected, the hyperplane connecting $\hat{f}_1$ and $\hat{f}_2$ is described by $\hat{f} \cdot \hat{h}$ =constant. In this case, $\hat{h}$ is a vector perpendicular to the plane, and the constant is $(\hat{g} \cdot \hat{g})$. The average filter is thus a specific linear combination of $\hat{f}_1$ and $\hat{f}_2$, each of which is another linear combination of the basis functions $\{\phi\}$:

$$\hat{h} = c_1 \hat{f}_1 + c_2 \hat{f}_2 = (c_1 a_{11} + c_1 a_{12})\hat{\phi}_1 + (c_2 a_{21} + c_2 a_{22})\hat{\phi}_2 \quad (6)$$

As to the basis function and average filter computation

We now consider the procedure by which the basis functions $\{\phi_j\}$ and the linear weights $c_j$ can be found and thus the average filter h. For this case, we consider the recognition of N reference functions $\{g_n\}$ described by Eq. (2). We describe the filter as a linear combination of the reference functions $$h(x) = \sum_j c_j \phi_j(x) \quad (7)$$

The intraclass pattern recognition correlation outputs can then be described by $$R_{g_n h}(0) = R_n(0) = R_n = g_n * h = \sum_j b_{nj} c_j \quad (8)$$

The objective is to find $\{\phi_j\}$, $b_{nj}$, then $c_j$ and finally h so that $R_n$ yields acceptable correlation performance.

We require shift invariance and assume that the N correlations $R_n$ peak at $\tau = 0$ for all registered inputs. This co-location feature requires us to shift each $g_n$ or $\phi_j$ to the correct input location when we form h. Such techniques are acceptable since this an off-line filter synthesis procedure. It also allows us the added flexibility of weighting the different portions of each $g_n$ differently when forming h.

We first form the unnormalized cross-correlation matrix $$R_{ij} = g_i * g_j \quad (9)$$

of all pairs of possible input functions $\{g_n\}$. This $R_{ij}$ has also been referred to as the autocorrelation matrix. If a Gram-Schmidt expansion for the $\phi_j$ is used, the $\phi_j$ can be found from the $R_{ij}$ in Eq. (9) using $$\begin{aligned} \phi_1(x) &= g_1(x)/k_1 \\ \phi_2(x) &= [g_2(x) - C_{12}\phi_1(x)]/k_2 \end{aligned} \quad (10)$$

$$\phi_n(x) = \left[ g_n(x) - \sum_{j=1}^{n-1} C_{nj}\phi_j(x) \right] / k_n$$

where the $k_n$ are normalization constants that are functions of the $R_{ij}$ and where the $C_{nj}$ are linear combinations of the $R_{ij}$ with known weighting coefficients. With $\phi_j$ determined as above, the coefficients $b_{nj}$ in Eq. (8), or equivalently the individual $b_j$ values in Eq. (2), are directly obtainable. If we then require all N correlations $R_n$ in Eq. (8) to be equal, we can solve Eq. (8) for the weights $c_j$ and thus obtain the desired average filter function h in Eq. (7).

As to experimental confirmation

The specific multivariant intraclass pattern recognition problem chosen to demonstrate the use of our method was the recognition of a M-60 tank independent of its orientation. In this case, the functions $\{g_n\}$ are different orientational views of the tank. Because of the excellent target signature information that they provide, IR imagery of the tank target was used. Although considerable advances in IR sensors have occurred, little attention has been given to the pattern recognition techniques required for IR imagery. The IR tank imagery used was taken in the 8–12-$\mu$m IR window because of the higher and more reliable radiance image variances possible in this region.

The $R_{ij}$ correlation matrix was produced using both the frequency plane correlator system of FIG. 1 and by digital techniques. All correlations were also obtained using weighted MSFs with different u' spatial frequencies. From these tests, the optimum u' spatial frequency band was found to be centered at u' = 2.25 cycles/mm. In the digital computations of $R_{ij}$, this weighted MSF synthesis was simulated by bandpass filter preprocessing of each image with a digital filter centered at u'. This is similar to the edge enchancement preprocessing operation used in multisensor image pattern recognition. For the experiments performed, IR images of the tank at seven different orientations were used. The $R_{ij}$ unnormalized correlation matrix is shown in Table I.

TABLE I

EXPERIMENTALLY OBTAINED UNNORMALIZED CORRELATION MATRIX $R_{ij}$

| Aspect | 1 | 2 | 3 | 4 | 5 | 6 | 7 |
|---|---|---|---|---|---|---|---|
| 1 | 2.42 | 0.29 | 0.15 | −0.24 | −0.09 | −0.12 | 0.10 |
| 2 | 0.29 | 2.19 | 0.10 | −0.14 | −0.10 | −0.07 | 0.06 |
| 3 | 0.15 | 0.10 | 4.95 | 0.02 | −0.35 | −0.30 | 0.03 |
| 4 | −0.24 | −0.14 | 0.02 | 1.51 | 0.04 | −0.02 | 0.04 |
| 5 | −0.09 | −0.10 | −0.35 | 0.04 | 3.87 | 0.03 | 0.02 |
| 6 | −0.12 | −0.07 | −0.30 | −0.02 | 0.03 | 3.93 | 0.02 |
| 7 | 0.10 | 0.06 | 0.03 | 0.04 | 0.02 | 0.02 | 0.22 |

A Gram-Schmidt expansion was used for the basis functions. The procedure outlined in Eq. (10) then yielded the desired $j$ and $b_{nj}$ values as shown in Table II. As seen in Table II, the resultant matrix has large diagonal and small off-axis values.

TABLE II

DIGITALLY COMPUTED COEFFICIENTS IN THE GRAM-SCHMIDT EXPANSION OF THE BASIS FUNCTIONS

| | $g_1$ | $g_2$ | $g_3$ | $g_4$ | $g_5$ | $g_6$ | $g_7$ |
|---|---|---|---|---|---|---|---|
| $\phi_1$ | 0.64 | — | — | — | — | — | — |
| $\phi_2$ | −0.08 | 0.68 | — | — | — | — | — |
| $\phi_3$ | −0.02 | −0.01 | 0.44 | — | — | — | — |
| $\phi_4$ | 0.07 | 0.04 | −0.00 | 0.82 | — | — | — |
| $\phi_5$ | 0.01 | 0.02 | 0.03 | −0.01 | 0.51 | — | — |
| $\phi_6$ | 0.02 | 0.01 | 0.02 | 0.01 | −0.00 | 0.50 | — |
| $\phi_7$ | −0.08 | −0.06 | −0.01 | −0.07 | −0.01 | −0.01 | 2.1 |

Figure 3:
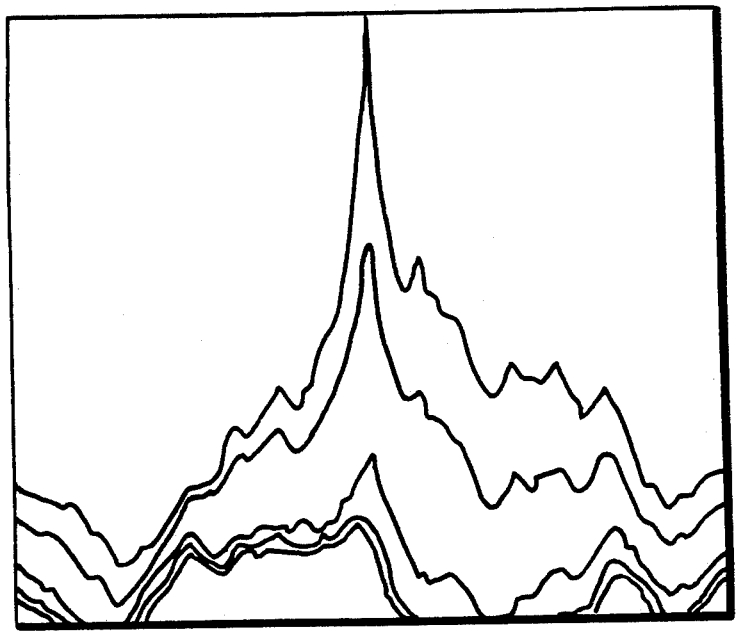
FIG. 3 shows cross sectional scans through one of the output correlation peaks.

The coefficients $c_j$ were then computed, and the expression for the average filter h in terms of the basis functions $\phi_j$ and the reference objects $\{g_n\}$ was then obtained as described hereinbefore. The resultant average filter, $$h = 0.64\phi_1 + 0.60\phi_2 + 0.42\phi_3 + 0.93\phi_4 + 0.57\phi_5 + 0.59\phi_6 + 1.85\phi_7, \quad (11)$$

was then digitally calculated and constructed. It was then correlated with all seven input image aspects $\{g_n\}$. Cross-sectional scans through one of the output correlation peaks are shown in FIG. 3. In all cases, high quality correlation peak intensities resulted with sharp correlation peaks and good correlation surfaces. This verified the use of this method in multivariant intraclass pattern recognition.

PERFORMANCE OF THE METHOD AND USE OF THE APPARATUS

Figure 2:
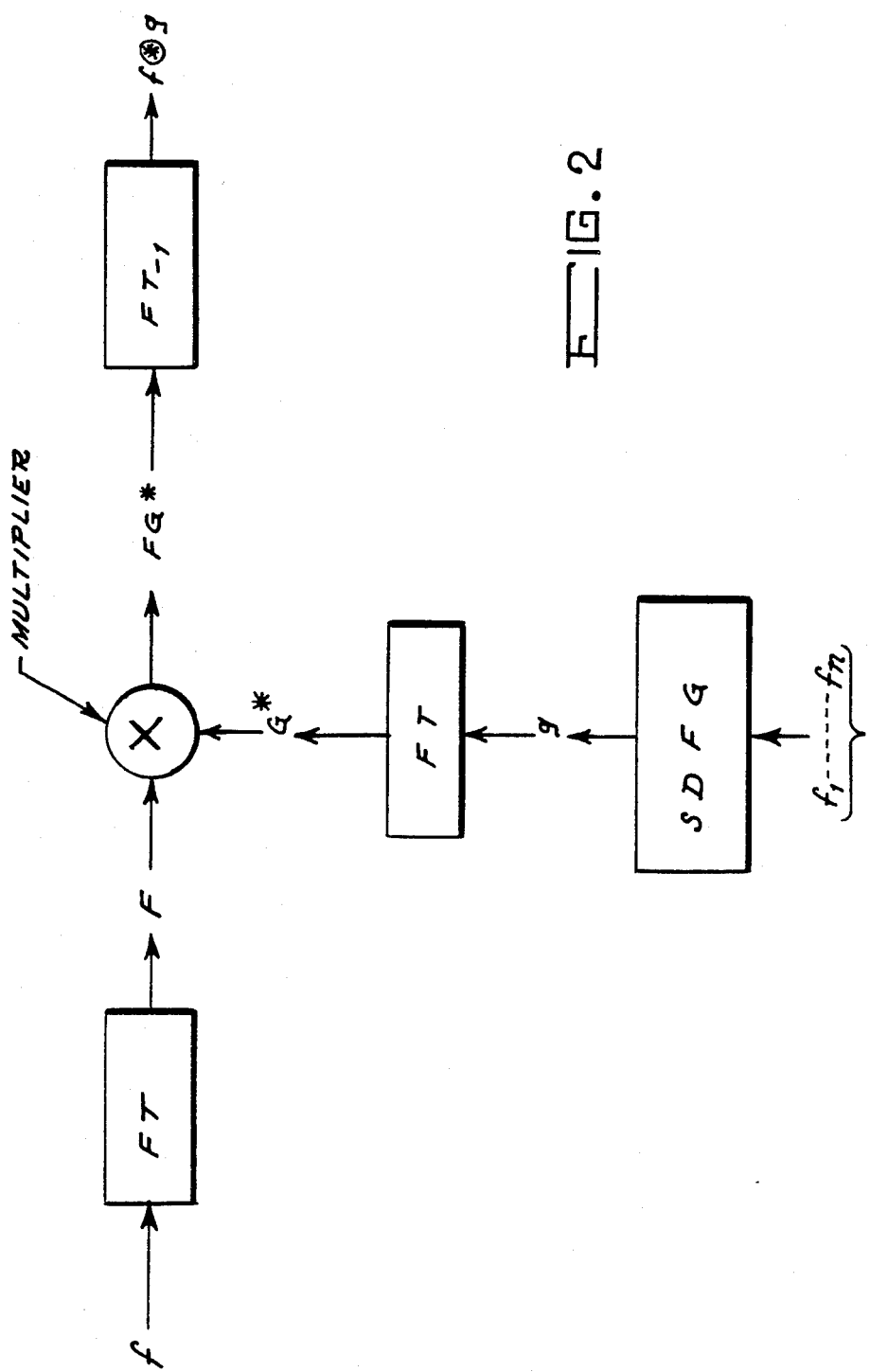
FIG. 2 is a block-diagram of the flow type which represents the fundamental steps of the inventive method, and the result of practicing the steps.

The performance of the fundamental steps of our method FIG. 2, and the use of the apparatus 10, FIG. 1, can be easily ascertained by any person of ordinary skill in the art from the foregoing description, coupled with reference to the Figures of the drawing and Table I and II herein.

For others, the following simplified explanation is given. With reference to FIG. 2, $P_1$, $P_2$ and $P_3$ are image planes, i.e., sheets of photographic film. The image of an object to be recognized (e.g., the hereinbefore mentioned tank) appears on $P_1$. $P_2$ includes a matched filter, i.e., a conjugate Fourier transform of a reference function, with this function representing the object to be recognized. $P_3$ indicates if such an object has been recognized.

Accordingly, the procedure for the use of the correlator 10, FIG. 1, is as follows: an image of the object appears at $P_1$; $L_1$ performs a Fourier transform of the image at $P_1$; the Fourier transform from $L_1$ is multiplied by the MSF at $P_2$; $L_2$ integrates over the multiplication; and, if any correlation between the images of $P_1$ and of $P_2$ exists, a spot of light or some other indication appears at $P_3$ to signify that an object, whose reference function appears at $P_2$, has been recognized.

In essence, therefore, the invention concerns the use of a particular matched filter at $P_2$ for recognizing different perspective views of the same object, and for maintaining discrimination between different but similar objects.

More specifically and succinctly, our inventive method comprises the fundamental steps of:

Firstly, obtaining a synthetic discriminant function for use in a pattern recognition hyperspace (i.e., a multidimensional vector space) formulation by using a Gram-Schmidt or Karhunen Loeve or other orthonormal basis function expansion technique; and Then, relating that discriminant function to a MSF in the optical correlator 10, FIG. 1.

Discriminant surfaces may be drawn from the function, and the shape of these surfaces defines the MSF. The discriminant surfaces may be formed off-line by digital computer means; recorded on film; and, placed at $P_2$, FIG. 1.

With reference to FIG. 2, therein are shown, with greater specificity and in a flow-type diagram, the above-mentioned fundamental steps of our inventive method, wherein:

$f_1 \ldots f_n$ comprise the training set, i.e., an adequate number of multivariant views of the interclass pattern;

SDFG is the synthetic discriminate function generator;

g is the synthetic discriminate function;

FT are Fourier transforms boxes;

G is the matched filter;

* is the conjugate;

f is the space function;

F is the Fourier transform of f; and $FT_{-1}$ is the inverse Fourier transform box.

Accordingly, the steps of our inventive method also may be stated as comprising the steps of:

Firstly, obtaining a training set, i.e., $f_1 \ldots f_n$.

Next, obtaining a synthetic discriminant function, i.e., g.

Lastly, relating that discriminant function g to MSF in the optical correlator 10, FIG. 1.

CONCLUSION

It is abundantly clear from all of the foregoing, and from the contents of the Figures of the drawing, that the stated objects of the invention, as well as objects related thereto, have been achieved.

It is to be noted that, because of our teachings herein, it may occur to others of ordinary skill in the art that, in appropriate particular circumstances, the number of the basic and fundamental steps of our inventive method can be increased, decreased, or otherwise varied, and/or that their sequence can be changed. In this regard, it is also to be noted that, in spite of any variations in the number or sequence of the steps of our method, the same disclosed and desired end results will be obtained nevertheless.

What is claimed is:

1. A method of pattern recognition comprising the steps of:

inputting a transform F of an input object f into a correlator:

inputting said transform F into a matched spatial filter having a transmittance proportional to H* wherein said H* is a conjugate transform of a multiclass reference function defined by h, said matched filter outputting a transform FH*, and forming a transform correlation product f * h of FH*.

2. A method of constructing a single matched spatial filter (MSF) having thereon a transformer of a multiclass reference function h, said method comprising the steps of:

calculating an average filter equation of said multiclass reference function h;

constructing an average filter h given said average filter equation;

placing said average filter h at a first position in a plane correlator;

forming a transform H of said multiclass reference function h by a lens in said plane correlator, placing a recording medium in a second position at a focus of said lens, and recording on said medium said transform H coherently interferring with a plane wave reference beam incident at a selected angle, said recording medium thereafter being a MSF H* having a transmittance that is proportional to said transform H*.

3. A method of constructing a single MSF as defined in claim 2 wherein said constructing of an average filter uses the Vander Lugt method.

* * * * *